United States Patent [19]
Kolberg et al.

[11] Patent Number: 5,707,118
[45] Date of Patent: Jan. 13, 1998

[54] VELOCITY BASED BRAKE CONTROL SYSTEM WITH DIRECTIONAL STABILITY

[75] Inventors: David A. Kolberg, Granger; Eric D. Alden, South Bend, both of Ind.

[73] Assignee: AlliedSignal, Inc., Morristown, N.J.

[21] Appl. No.: 529,259

[22] Filed: Sep. 15, 1995

[51] Int. Cl.$^6$ .................................................. B60T 8/32
[52] U.S. Cl. .................................................. 303/126; 303/169
[58] Field of Search .................................. 303/155, 126, 303/113.4, 146, 169; 244/111; 188/181 C, 181 A

[56] References Cited

U.S. PATENT DOCUMENTS

| | | | |
|---|---|---|---|
| 3,713,704 | 1/1973 | Koppl et al. | 188/181 C |
| 3,920,282 | 11/1975 | DeVlieg | 303/126 |
| 4,076,331 | 2/1978 | DeVlieg | 303/93 |
| 4,135,769 | 1/1979 | Willims et al. | |
| 4,180,223 | 12/1979 | Amberg. | |
| 4,269,455 | 5/1981 | Beck et al. | |
| 4,323,969 | 4/1982 | Skarvada. | |
| 4,484,281 | 11/1984 | Skarvada. | |
| 4,484,282 | 11/1984 | Cook et al. | |
| 4,523,282 | 6/1985 | Beck. | |
| 4,543,633 | 9/1985 | Cook. | |
| 4,562,542 | 12/1985 | Skarvada. | |
| 4,613,190 | 9/1986 | Johnson. | |
| 4,881,784 | 11/1989 | Leppek. | |
| 5,136,510 | 8/1992 | Beck | 303/126 |
| 5,333,942 | 8/1994 | Peczkowski et al. | 303/113.4 |

FOREIGN PATENT DOCUMENTS

| | | |
|---|---|---|
| 0 038 606 | 10/1981 | European Pat. Off. . |
| 34 38 113 | 4/1986 | Germany . |
| 195 28 586 | 2/1996 | Germany . |
| 3-239653 | 10/1991 | Japan . |

*Primary Examiner*—Matthew C. Graham
*Attorney, Agent, or Firm*—Larry J. Palguta

[57] ABSTRACT

Enhanced directional stability in an aircraft anti-skid braking system is achieved by using one common deceleration command (16) which is a selected one of left and right brake pedal deceleration commands (19, 119). The individual brake pedal deceleration commands (19, 119) are used to modify (34, 134) the common or selected deceleration command (16) and provide respective side wheel velocity commands to retain a differential braking capability (36, 136), and thereby avoid the potential for instability inherent when utilizing individual deceleration commands for the left and right wheel brakes of an aircraft.

5 Claims, 4 Drawing Sheets

VELOCITY BASED BRAKE CONTROL SYSTEM WITH DIRECTIONAL STABILITY

The present invention relates generally to vehicular anti-skid braking systems, and more particularly to a vehicular braking system having directional stability features.

BACKGROUND OF THE INVENTION

Anti-skid or anti-lock braking systems for aircraft are in wide-spread use. Examples of anti-skid systems are U.S. Pat. Nos. 4,078,845; 4,180,223; 4,412,291; 4,610,484; 4,822,113; and 5,136,510. It is desirable, for example, in aircraft braking systems, to have individual brake pedals to control independently left and right wheel braking. It is also highly desirable for aircraft braking systems to be capable of anti-skid operation, and such a system is shown in Peczkowski U.S. Pat. No. 5,333,942. This patented system operates extremely well in its anti-skid mode. In the normal braking mode, however, the system could have less than optimal operation. If a pilot commands different decelerations with the two pedal controls, both right and left braking systems will begin to slow the aircraft. When the larger of the two commanded decelerations is achieved with the aircraft moving down a runway in a straight line, both right and left wheels tend to decelerate at the greater of the two commanded decelerations. The more highly commanded wheel brake performs most of the braking and the other wheel brake drops in braking pressure. The lesser commanded wheel brake continues to drop in braking pressure because its actual deceleration is tending to be greater than what is being demanded for it. The situation is unstable and the pressures can continue to diverge until only the greater commanded wheel brake is performing any braking. It is desirable to avoid a normal braking mode unstable condition which can occur when unequal decelerations are commanded to the aircraft wheel brakes.

SUMMARY OF THE INVENTION

The present invention provides solutions to the above by providing an improved method of employing commanded decelerations for braking a vehicle having individual controls for effecting respective left side wheel commanded deceleration for a left side wheel and right side wheel commanded deceleration for a right side wheel, comprising the steps of selecting one of the wheel commanded decelerations; integrating the selected commanded deceleration; superimposing the integrated commanded deceleration with velocity commands proportional to respective side wheel commanded decelerations to provide respective side wheel velocity commands; and utilizing the respective side wheel velocity commands to determine braking forces for the left side wheel and right side wheel.

BRIEF DESCRIPTION OF THE DRAWINGS

Corresponding reference characters indicate corresponding parts throughout the several views of the drawings.

DESCRIPTION OF THE INVENTION

Figure 1:
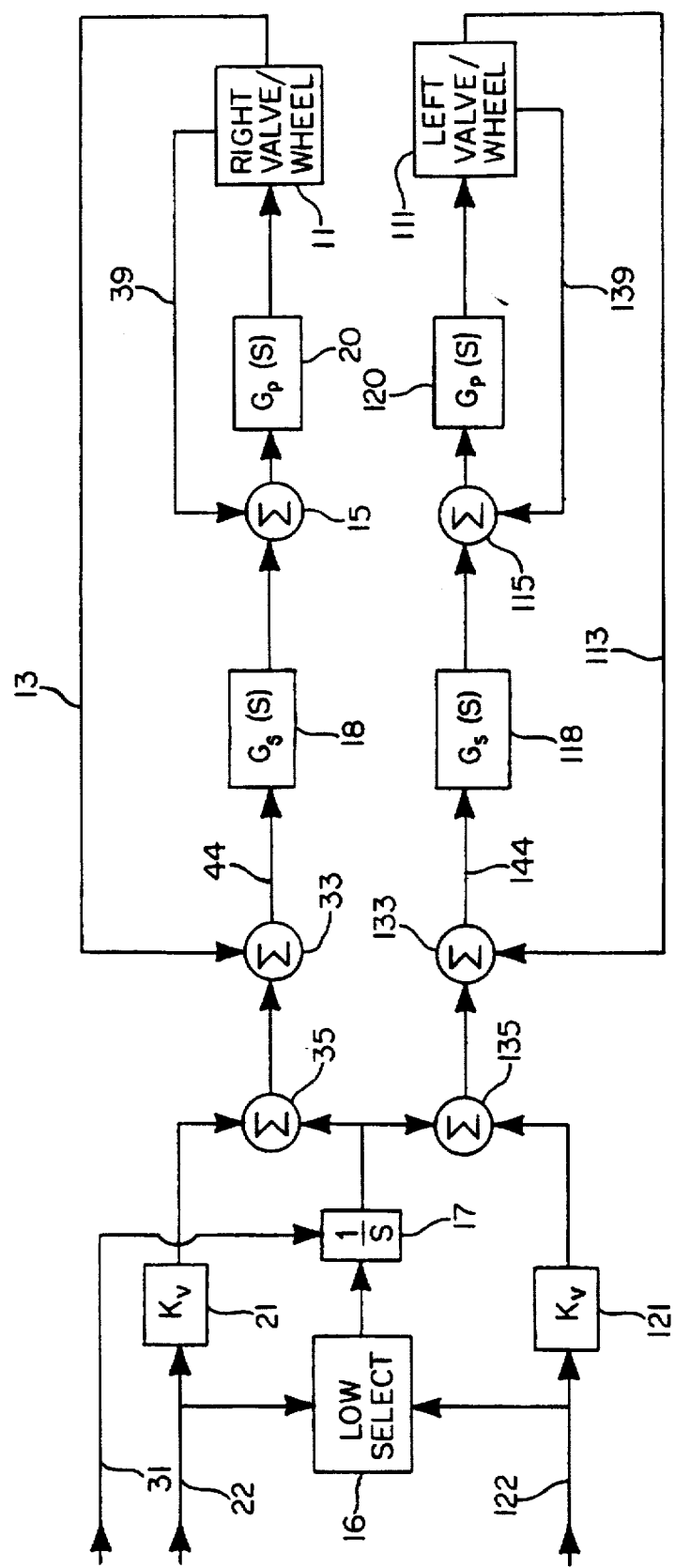
FIG. 1 illustrates the present invention in the form of a generalized schematic representation of a portion of an anti-skid brake control system and which operates in a non-skid braking mode.

The preferred environment of the present anti-skid system is in aircraft braking where the operator is the pilot and has separate left and right wheel brake control pedals. The system will at times be described for a single wheel of such an aircraft, it being understood that in the aircraft environment the system may be duplicated for another wheel while in other environments more than one wheel may be under the control of a single pedal or other operator control. All such variations are within the scope of the terms "left wheel" and "right wheel."

The drawing Figures exhibit a great deal of symmetry. The dotted line 10 in FIG. 3 separates the right wheel circuit from the left wheel, circuit. The left wheel braking components have reference numerals 100 larger than their right wheel braking counterparts. Thus, 11 identifies the right valve and wheel while 111 identifies its left counterpart.

The braking control system is operative when the aircraft or other vehicle is slowing, that is, at negative accelerations. When the term "deceleration" is used herein, it is the negative of acceleration and positive.

In FIG. 1, an anti-lock braking system for an aircraft or similar vehicle is shown schematically in the normal braking (non anti-skid or non-anti-lock) mode. The system receives an input angular velocity indicative signal from the right vehicle wheel and brake valve 11 thereof on line 13. Wheel hubcap mounted permanent magnets and a sensing coil fixed to the axle adjacent the hubcap (not shown) in which a series of pulses are induced as the wheel rotates, or other electro-mechanical or optical arrangements, may be used. This signal is supplied as one input to the summer 33. A signal representative of the acceleration commanded by the right brake pedal depression is supplied on line 22 while a similar signal for the left brake pedal commanded acceleration appears on line 122. The lesser of these two commanded accelerations (the more negative and also greater in magnitude deceleration) is selected by the low select circuit 16 and supplied as one input to the integrator 17. The integrator 17 also receives the initial aircraft speed on line 31. The velocity indicative output signal or integrated commanded deceleration from the integrator 17 is supplied to both wheel circuits by way of the summing circuits 35 and 135. An actual wheel speed signal on line 13 is compared to the wheel speed signal from summer 35 and the difference, a speed error signal on line 44, is processed by variable gain and lead/lag filter 18 to produce a pressure signal as one input to the summer 15. This pressure signal is summed with an actual braking pressure signal on line 39 to produce a pressure error signal. The loop which includes compensator block 20 acts on or with right valve/wheel 11 to ensure that the braking pressure signal on line 39 tracks commanded pressure. Thus, the speed compensation circuit 18 provides a pressure command based on the closed loop feedback speed error while the brake pressure compensation circuit 20 provides energization to the wheel brake cylinder based on closed loop feedback pressure error.

By way of the gain circuits 21 and 121 and summers 35 and 135, the pedal input lines 22 and 122 also provide individual pedal or velocity commands proportional to respective side wheel commanded decelerations, to the velocity indicative output signal from the integrator 17 so that the system provides respective side wheel velocity commands to enable rapid, controlled directional differential braking for the completely independent system of the above-mentioned Peczkowski U.S. Pat. No. 5,333,942. Thus, the individual wheel speed commands or side wheel velocity commands at the inputs to summers 33 and 133 are superpositions of the individual pedal commands and the integrated commanded deceleration.

Figure 2:
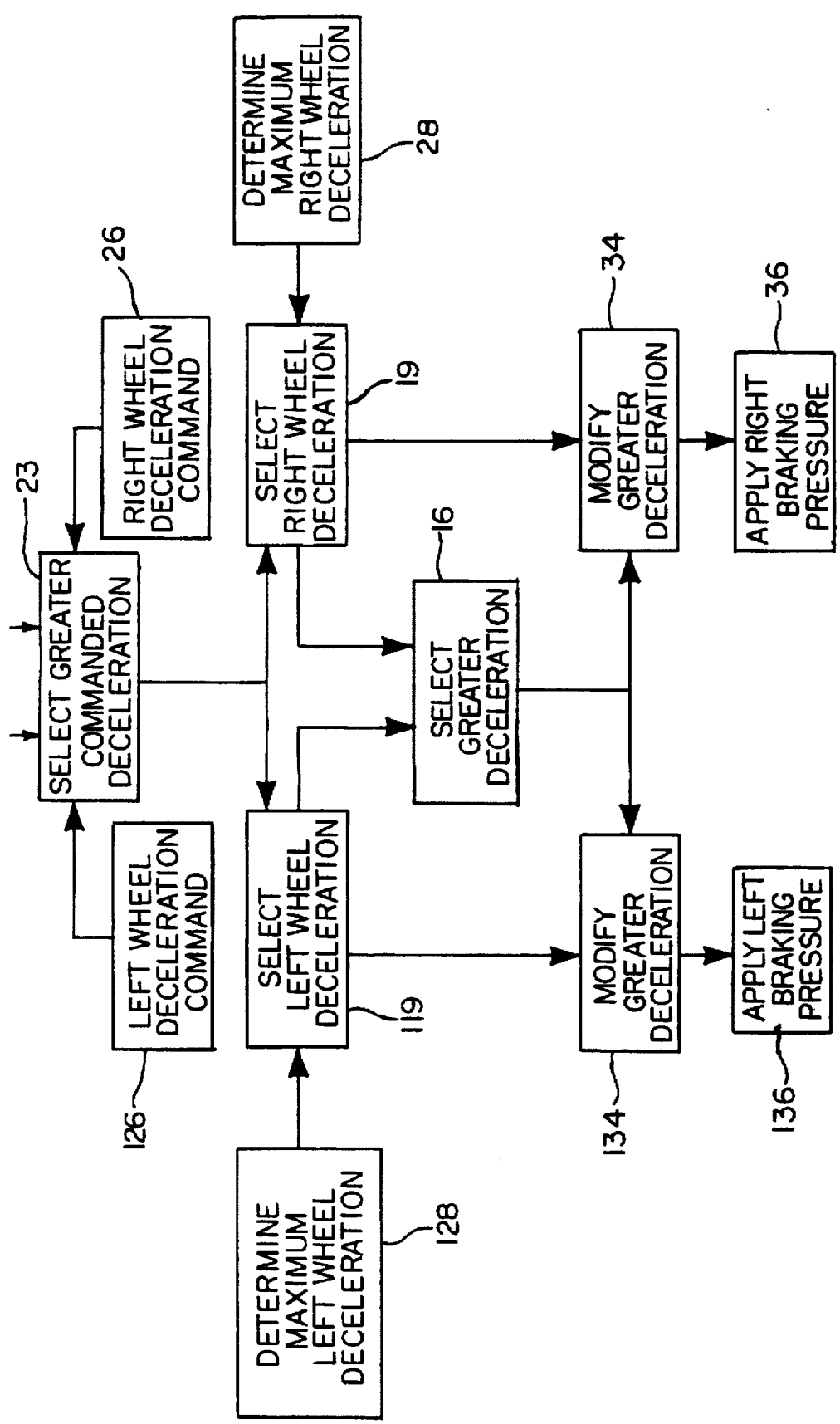
FIG. 2 is a functional block diagram of the process of the present invention cast in terms of deceleration.

The operation of the system of FIG. 1 is illustrated in FIG. 2. The greater of the selected right 19 and left 119 decelerations is selected at 16. This common deceleration is modified by the right wheel deceleration at 34 and the modified deceleration command is utilized in applying a braking pressure 36 to the right wheel brake. The common deceleration 16 is similarly modified by the left wheel deceleration to provide a left wheel braking pressure 136. To provide an anti-skid function, wheel speed is used to determine a maximum right wheel deceleration value at 28. The lesser of the right wheel deceleration 28 and selected commanded wheel deceleration 23 (the greater in magnitude of the two wheel deceleration commands) is selected at 19. If command 23 is utilized, the system is in a conventional mode while if command 28 is utilized, the system is in its anti-skid mode. Left wheel maximum deceleration is utilized similarly.

Uneven torques on the brakes causes a yaw moment during a skid. Using a low select for circuit 16 (selection of the greater deceleration) provides for higher efficiency stops and slightly lower directional stability in the event of one wheel skidding. However, the use of a high select for circuit 16 (selecting the lesser deceleration) would provide a lower efficiency stop with a slightly higher directional stability. The torques on the brakes would be reduced for both brakes, thereby keeping the yaw forces more equal during the skid. However, this reduces the braking forces on the wheel that is not skidding and thereby reduces the efficiency. The preferred embodiment illustrated in FIGS. 1–3 uses the low select circuit 16 (selecting the greater deceleration) to maintain a higher brake stop efficiency and provide directional stability, but either circuit could be used depending on performance requirements and both will provide the desired directional stability.

Figure 3A:
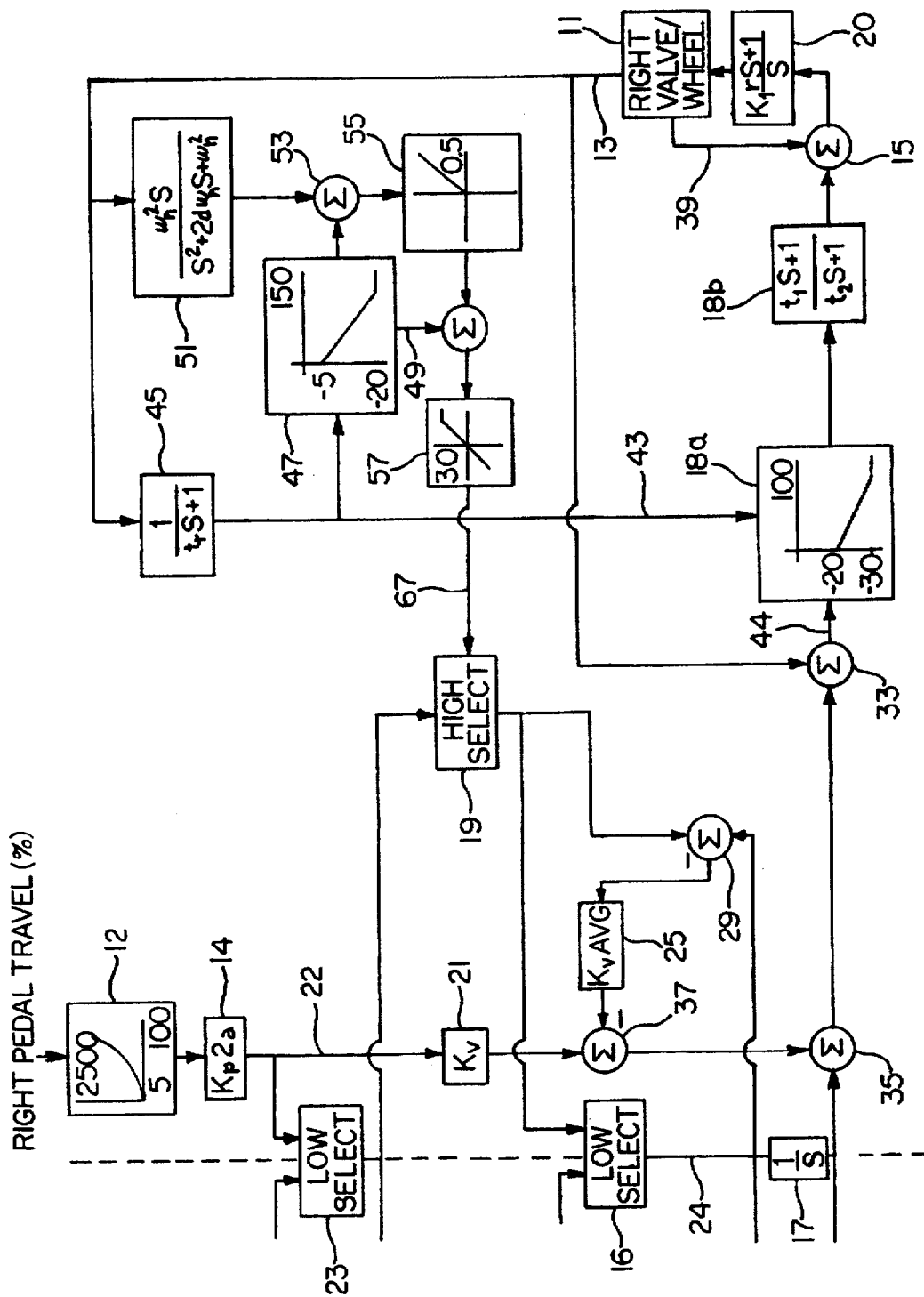
FIGS. 3a and 3b are a more complete and detailed schematic representation of the anti-skid brake control system which incorporates the portion illustrated in FIG. 1.
Figure 3B:
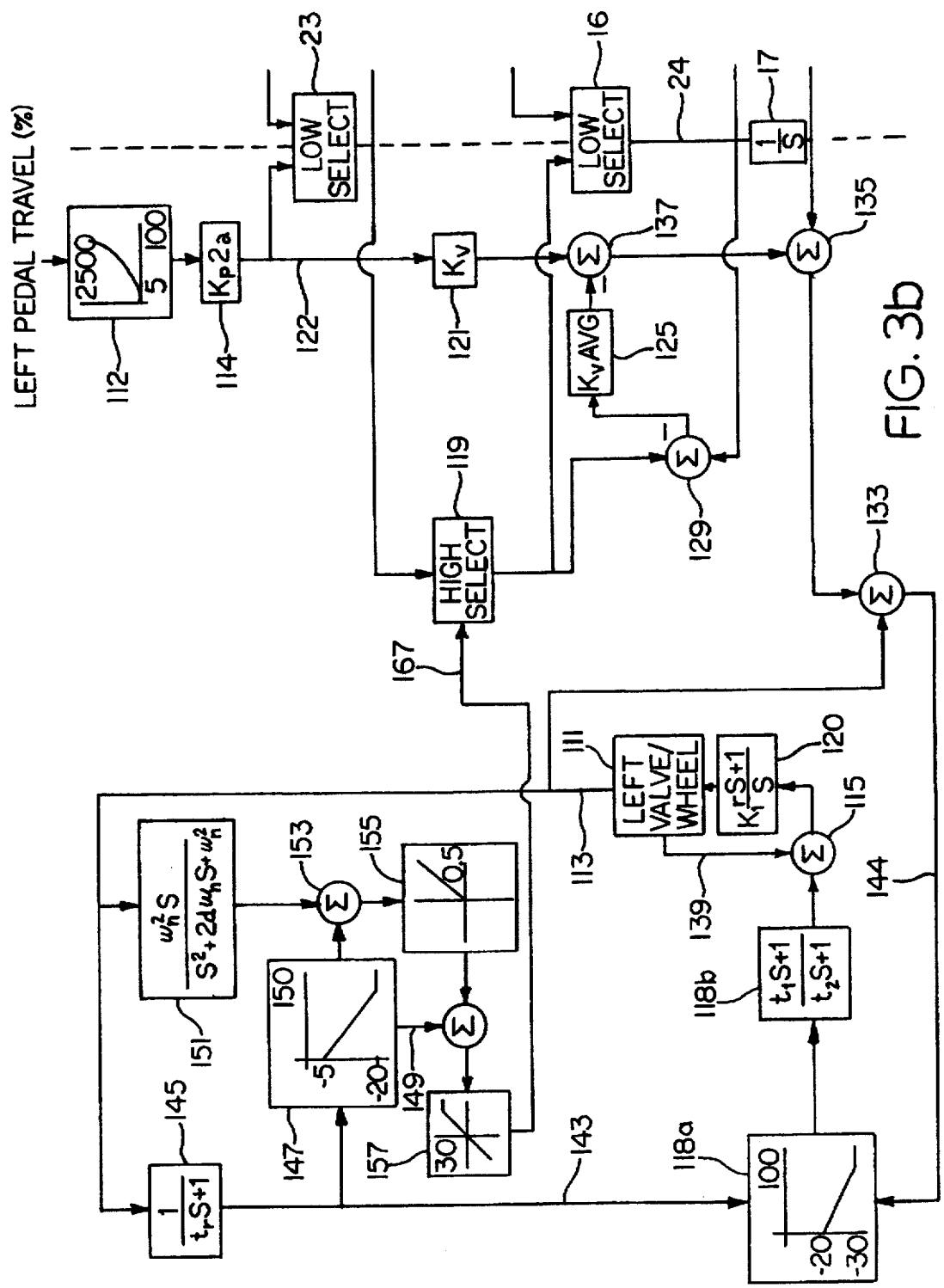

Comparing FIGS. 1 and 3a and 3b, it will be noted that the operator input as a percentage of total pedal stroke is converted to a pressure value at pedal travel block 12 and that pressure value is modified by a gain factor at block 14.

As seen in greater detail in FIG. 3a, the control system actually receives two signals from the vehicle wheel 11. In addition to the wheel angular velocity indicative signal on line 13, a transducer (not shown) provides a signal representative of actual brake pressure via line 39. The following arrangement provides on line 67 an upper bound on the magnitude of the vehicle deceleration in response to the measured wheel velocity on line 13. The circuit receives via line 43, in addition to the angular velocity indicative signal on line 13, a reference speed indicative signal from the first order filter 45. This reference speed signal is supplied to the deceleration schedule circuit 47 which provides on line 49 a determined maximum angular deceleration signal for the particular input speed. The circuit also includes means for calculating the angular deceleration of the wheel from the measured angular velocity on line 13 in the form of a second order filter and differentiator 51. The difference between the computed or calculated angular deceleration from filter/differentiator 51 and the determined maximum angular deceleration from the schedule circuit 47 is determined at comparator 53. Circuit 55 modifies the determined maximum angular deceleration by a fraction (0.5 as an illustrated example) of the determined difference only if the determined maximum angular deceleration is greater than the calculated angular deceleration. The fraction of the determined maximum angular deceleration and the scheduled value (determined maximum angular deceleration) from circuit 47 are compared and the arithmetic sum is limited to, for example, 30 radians per sec. per sec. by circuit 57. This limited value or deceleration upper bound on line 67 is compared to the commanded deceleration and the lesser deceleration of the two values is supplied as the output of the high select circuit 19. This signal is compared to its left wheel counterpart in low select circuit 16 and the lower acceleration (greater deceleration) appears at the output of low select circuit 16.

The anti-skid braking system of the present invention provides control of the wheel brakes such that if one wheel is in a normal, nonanti-skid braking mode and the other wheel is in an anti-skid braking mode, the anti-skid braking mode of the other wheel is modified and the normal braking mode of the one wheel is maximized according to its braking pressure command. If both wheels are in respective anti-skid braking modes, the anti-skid function of the system comprises a maximization of the deceleration command to both wheel brakes while independently modifying the velocity command to the wheel which is closer to an incipient skidding condition. Referring to FIGS. 3a and 3b, the individual commanded decelerations or maximum decelerations at the outputs of high select circuits 19 and 119 are combined with (superposed on) the signals on line 24, for example on the right wheel side via summer 29, a gain circuit 25, and summer 37. Further, the original pedal indicative signals are conveyed by way of gain circuits 14 and 21 to be summed at summer 37 with the output of gain circuit 25. Finally, the pedal indicative signals are combined with the common integrated velocity value, for both wheel sides, from integrator 17 at summer 35. As described previously for FIG. 1, the comparison of the output of summer 35 with the measured angular velocity at comparator 33 produces a speed error signal on line 44. The speed error signal on line 44 is multiplied by variable gain block 18a and lead/lag falter 18b to produce a pressure command as one input to the summer 15. This pressure command is summed with the pressure representative signal on line 39 to produce a pressure error signal. Compensator block 20 acts on or with valve/vehicle 11 to ensure the brake pressure representative signal on line 39 tracks commanded pressure.

For example, if the right pedal is depressed to indicate a desired acceleration of −30 ft./sec.$^2$ while the left pedal depression commands −20 ft./sec.$^2$, the −30 ft./sec.$^2$ value will appear at the output of low select circuit 23. Suppose that the minimum allowable or permitted right wheel acceleration from line 67 is −40 ft./sec.$^2$ while that for the left wheel (from line 167) is −15 ft./sec.$^2$, whereby the right wheel brake will operate in a nonanti-skid mode and the left wheel brake will operate in an anti-skid mode. The output of high select circuit 19 would be −30 ft./sec.$^2$ while that from 119 would be −15 ft./sec.$^2$ Both of these outputs are supplied to low select circuit 16 and the output would be −30 ft./sec.$^2$ The difference between this −30 ft./sec.$^2$ and the left high select value of −15 ft./sec.$^2$ would appear as −15 ft./sec.$^2$ at the output of summer 129, while summer 29 would have 0 ft./sec.$^2$ as its output. The output of summer 129 is modified at block 125 whose output is summed at 137 with the modified pedal command from block 121 to effect a modified velocity command as the output of summer 135 which is a superposition of the output from integrator 17 and summer 137. The velocity command from summer 35 is a result of the modified pedal command from block 21 and the output of the integrator 17, whereby the velocity command output of summer 35 is not modified by the anti-skid function of the system and the normal braking mode is maximized according to its braking pressure command.

In a second example, if the right brake pedal is depressed to indicate a desired acceleration of −30 ft./sec.$^2$ while the left brake pedal depression commands −20 ft./sec.$^2$, the −30 ft./sec.$^2$ value appears at the output of the low select circuit 23. Suppose that the maximum allowable right wheel deceleration is −25 ft./sec.$^2$ while that for the left wheel is −15 ft./sec.$^2$, whereby both wheel brakes will operate in anti-skid modes. The allowable or permitted output of high select circuit 19 would be −25 ft./sec.$^2$ while that from high select circuit 119 would be −15 ft./sec.$^2$ Both of these outputs are supplied to low select circuit 16 and the output would be −25 ft./sec.$^2$ The difference between this −25 ft./sec.$^2$ and the left high select value of −15 ft./sec.$^2$ would appear as −10 ft./sec.$^2$ at the output of summer 129, while summer 29 would have 0 ft./sec.$^2$ as its output. The output of summer 129 is modified at the gain circuit 125 whose output is summed at 137 with the modified pedal command from block 121 to effect a modified velocity command as the output of summer 135 which is a superposition of the outputs from integrator 17 and summer 137. The velocity command from summer 35 is a result of the modified pedal command from block 21 and the output of integrator 17, whereby the velocity command output of the summer 35 is modified by the anti-skid function of the system as a result of the high select circuit 19 initially limiting the commanded right wheel deceleration-to that permitted by the anti-skid system.

What is claimed is:

1. An improved method of employing commanded decelerations for braking a vehicle having individual controls for effecting respective left side wheel commanded deceleration for a left side wheel and right side wheel commanded deceleration for a right side wheel, comprising the steps of:

selecting one of the wheel commanded decelerations;

integrating the selected commanded deceleration to provide a velocity command;

superimposing the velocity command with velocity commands proportional to respective side wheel commanded decelerations to provide respective side wheel velocity commands; and utilizing the respective side wheel velocity commands to determine braking forces for the left side wheel and right side wheel; and further including the steps of determining a maximum right side wheel deceleration, comparing the maximum right side wheel deceleration and the selected commanded deceleration and substituting the lesser of the compared decelerations for the right side wheel commanded deceleration in the steps of selecting and integrating, determining a maximum left side wheel deceleration, and comparing the maximum left side wheel deceleration and the selected commanded deceleration and substituting the lesser of the compared decelerations for the left side wheel commanded deceleration in the steps of selecting and integrating.

2. The method of claim 1, wherein the step of selecting comprises comparing the wheel commanded decelerations to determine the greater in magnitude of the wheel commanded decelerations.

3. The method of claim 1, wherein the step of selecting comprises comparing the wheel commanded decelerations to determine the lesser in magnitude of the wheel commanded decelerations.

4. A brake control system for providing anti-skid control in a wheeled vehicle having means for supplying pressurized brake fluid to actuate right and left vehicle wheel brakes of the vehicle, comprising:

a right operator actuatable control for determining an operator commanded right wheel deceleration and accordingly controlling a supply of pressurized brake fluid to at least one right vehicle wheel brake;

means for measuring a right wheel velocity;

means responsive to measured right wheel velocity and for providing a deceleration upper bound on the magnitude of the right wheel deceleration;

means for comparing the commanded right wheel deceleration and the right wheel deceleration upper bound and for selecting the lesser in magnitude of the right wheel decelerations;

a left operator actuatable control for determining an operator commanded left wheel deceleration and accordingly controlling a supply of pressurized brake fluid to at least one left vehicle wheel brake;

means for measuring a left wheel velocity;

means responsive to measured left wheel velocity and for providing a deceleration upper bound on the magnitude of the left wheel deceleration;

means for comparing the commanded left wheel deceleration and the left wheel deceleration upper bound and for selecting the lesser in magnitude of the left wheel decelerations;

means for comparing the lesser in magnitude of the right wheel decelerations and the lesser in magnitude of the left wheel decelerations and for selecting the greater in magnitude deceleration;

means for combining the greater in magnitude deceleration and the lesser in magnitude of the right wheel decelerations to form a right wheel value;

means for combining the greater in magnitude deceleration and lesser in magnitude of the left wheel decelerations to form a left wheel value;

means utilizing the right wheel value for supplying pressurized brake fluid to said one right vehicle wheel brake to apply a right wheel braking torque that is a function of the right wheel value; and means utilizing the left wheel value for supplying pressurized brake fluid to said one left vehicle wheel brake to apply a left wheel braking torque that is a function of the left wheel value.

5. An aircraft braking system having independent left side and right side brake control circuits each including an operator actuatable control for establishing an operator commanded wheel deceleration and means for applying to a respective side wheel a braking torque of a magnitude at least in part determined by the commanded wheel deceleration, the improvement comprising means for selecting one of the operator commanded wheel decelerations, means for integrating the selected commanded wheel deceleration to provide a velocity command, means for superimposing the velocity command with velocity commands proportional to respective operator commanded wheel decelerations to provide respective side wheel velocity commands, and means for utilizing the respective side wheel velocity commands to determine braking forces for the respective side wheels, and further including means for determining a maximum right side wheel deceleration, means for comparing the maximum right side wheel deceleration and the selected commanded deceleration and substituting the lesser of the compared decelerations for the respective operator commanded wheel deceleration, means for determining a maximum left side wheel deceleration, and means for comparing the maximum left side wheel deceleration and the selected commanded deceleration and substituting the lesser of the compared decelerations for the respective commanded wheel deceleration.

* * * * *